April 29, 1930.  E. BREDOW  1,756,237
SLICING MACHINE
Original Filed Aug. 19, 1927   3 Sheets-Sheet 3
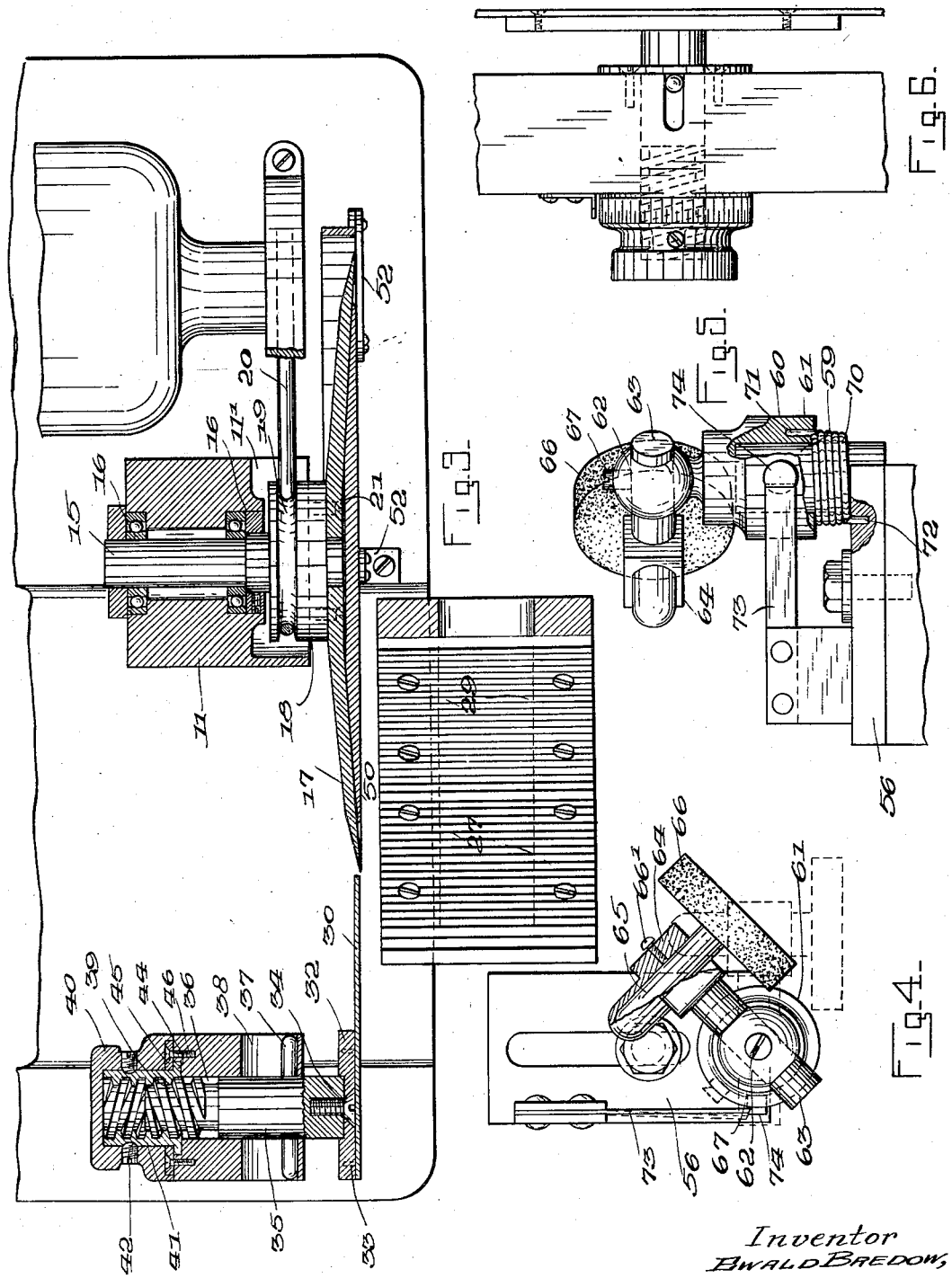

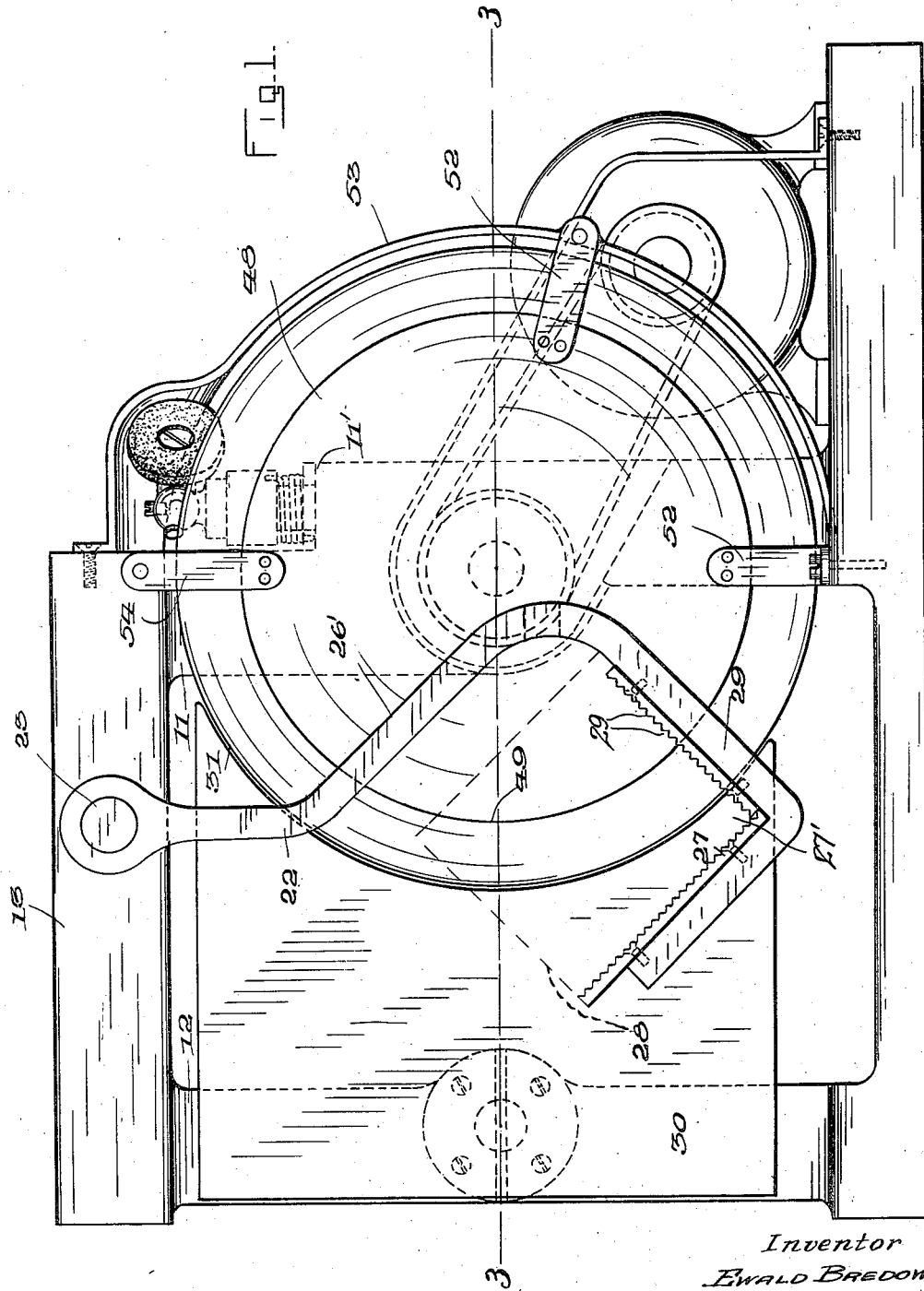

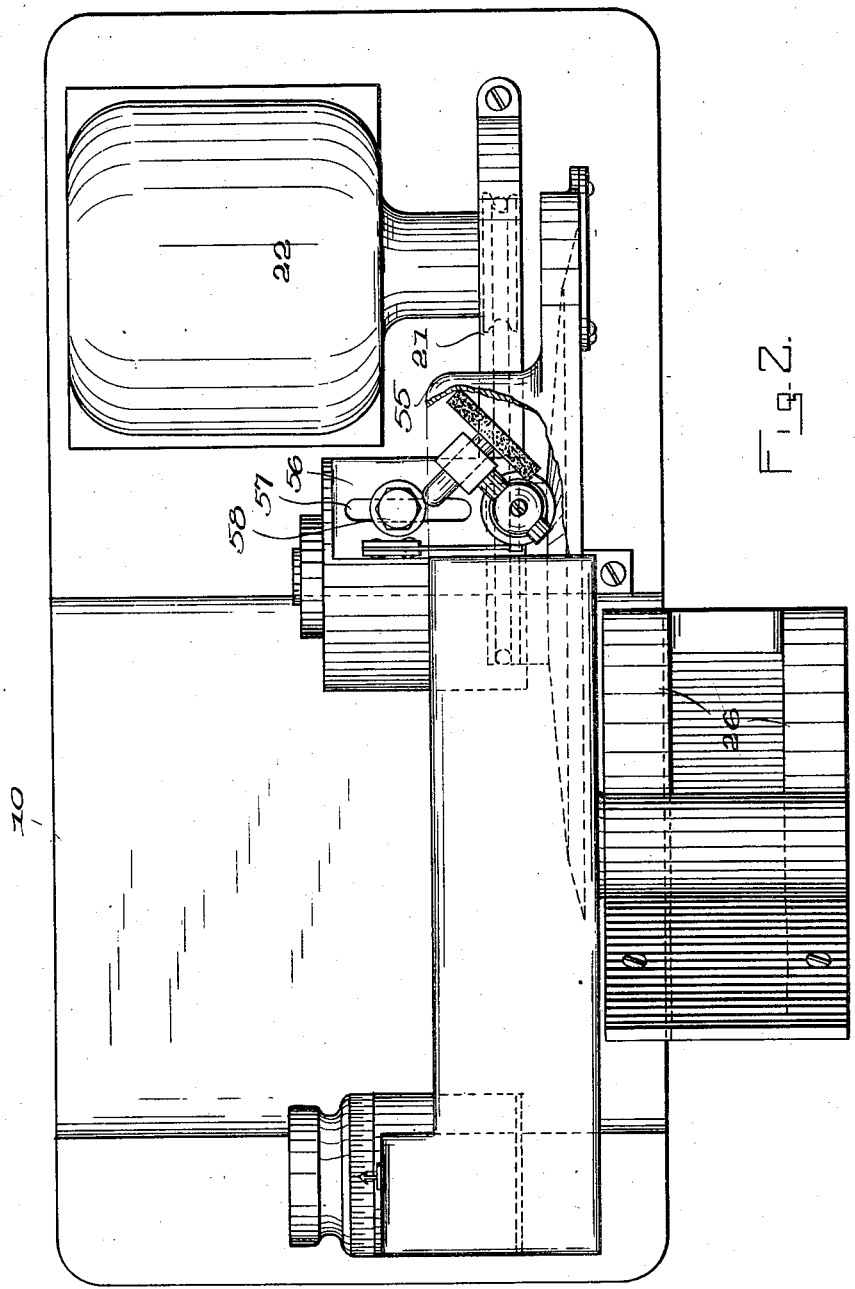

Patented Apr. 29, 1930

1,756,237

UNITED STATES PATENT OFFICE

EWALD BREDOW, OF ALBANY, NEW YORK, ASSIGNOR OF ONE-HALF TO A. W. MEYER, OF ALBANY, NEW YORK

SLICING MACHINE

Application filed August 19, 1927, Serial No. 214,050. Renewed July 1, 1929.

This invention relates to slicing machines and more particularly of the type comprising a rotary knife and means for moving a body such as meat, cheese, etc. to be sliced relative to the knife.

An object of the invention is to provide a machine which is simple in construction and which consequently can be manufactured and sold at a comparatively small cost.

A further object of the invention is to provide a machine which is efficient in operation and which may be used for considerable periods with a minimum amount of repair and adjustment. These and other objects of the invention will become clearer as the description proceeds in connection with the preferred embodiment shown in the accompanying drawings wherein Figure 1 is a side elevational view of a slicing machine embodying the invention.

Figure 2 is a top plan view.

Figure 3 is a horizontal sectional view on the line 3—3 of Figure 1.

Figure 4 is a fragmentary top plan view showing the knife sharpening means.

Figure 5 is an elevational view of the sharpening means with parts broken away, and Figure 6 is a fragmentary and elevational view showing the means for adjusting the gauge plate.

Referring to the drawings for a more detailed description, the frame of the machine includes a base 10 having upright arms 11, 12, connected at their upper ends by a crossbar 13. A horizontal shaft 15 is rotatably mounted in ball bearings 16 within the arm 11 and carries a cutter 17 in the form of a vertically disposed circular rotatable knife, to the back of which is attached a pulley 18 adapted to be driven by a belt 19 from a driving pulley 21 upon the shaft of a motor 22 mounted upon the base. As will be observed, the arm 11 is cut away as at 11', to provide a recess for the reception of the pulley 18.

An oscillatory rack or carrier 22 is pivotally mounted at 23 on the cross bar 13 so that it is suspended by the latter and is adapted to oscillate in a path on the outer side of the cutting disc or knife 17. The lower end of the rack, which is formed by two spaced arms 26 carries a substantially V-shaped tray or platform 27 having material engaging serrations, whereby there is provided a channeled or guttered seat 27' for the material to be sliced which may be a block of cheese as indicated by the dotted lines 28 in Figure 1. Obviously, any other sliceable material may be carried by this rack, the inner walls of the seat being formed with serrations 29 to insure the holding of the material against accidental movement. It will be observed that the arms extend downwardly from the pivot 23 and have intermediate portions 26' which are deflected laterally so that the material is suspended directly beneath the pivot, so that when the machine is not in use the material will be properly balanced and will not be offset with respect to the axis 23.

As will be observed, the tray or platform is open at its inner end adjacent the knife and its supporting faces are disposed in a plane at a right angle to the vertical plane of the knife. This relative arrangement of the seat or platform and the knife makes the feeding of the material along its seat totally independent of the action of gravity. In other words, as the operator manually swings the pendent rack, with his hand upon the material, the latter may be fed toward the knife at an appropriate speed and it is unnecessary for the operator to take into consideration the action of gravity, due to the right angular relation of the seat faces to the vertically disposed knife. This construction permits the feed of the material to be readily controlled by the operator as he maintains his hand upon the material while swinging the rack back and forth. The substantially V-shaped formation of the seat provides walls relatively inclined to one another thus assisting the operator in swinging the rack, since the material cannot be dislodged by the operator's pressure, and these walls also direct the material toward the knife. Moreover, it will be observed that the pendent arrangement of the rack provides a certain amount of centrifugal force which assists the pressure of the operator in maintaining the material in its seat.

A gauge plate 30 is mounted at one side of the knife and has a curved edge substantially conforming to the adjacent knife edge. The plate is secured to a backing-piece 32, as by screws 33, and the latter is in turn secured by means of a screw 34 to a stud 35 which fits within an opening 36 extending through the arm 12 of the frame. The stud is provided with laterally directed pins 37 which extend into slots 38 in the arm and hold the stud against rotation, thus restricting the stud to a sliding movement through the opening 36 which is permitted in order to adjust the gauge plate 30 toward and from the plane of the knife edge which, as will be understood, determines the thickness of the cut. For the purpose of adjusting the gauge plate, the stud is provided with screw threads 39 adapted to receive an adjusting nut or cap 40 having an internally threaded sleeve portion 41 retained within the cap as by set screws 42. The sleeve 43 has an end flange 44 which freely fits beneath a disc 45 fixedly secured by screws 46 to the arm, the disc having a central opening through which the sleeve projects into the cap 40 and serving to prevent movement of the cap away from the arm.

As will be understood, rotation of the cap 40 and its internal sleeve 41 will effect movement of the stud and gauge plate toward and from the plane of the knife edge and thus determine the thickness of the slice. The material is placed within the seat 27' and pressed firmly down upon the serrations 29 on the inner wall of the platform 27. The rack with its contents is then swung to the left (Fig. 1) as by engagement with the material thereon until the contents are withdrawn from the plane of the cutting knife. The material to be sliced is then pushed by the hand inwardly along the seat 27 until it engages the gauge plate 30, whereupon the rack is then swung rearwardly or to the right (Fig. 1) bringing the material into engagement with the cutting knife, this rearward movement being continued until the knife has passed entirely through the material and removed a slice therefrom. The slice falls upon the bed 10 or on a tray which may be placed thereon.

In order to prevent engagement of the material with the edge of the knife as the rack is moved to the left (Figure 1) after a slice has been cut, a guard element in the form of a plate 48 may be positioned over the face of the disc or knife. The plate 48 should be of such size that its edge 49 is spaced inwardly from the edge of the knife but the plate should be arranged so that its outer face 50 (Figure 3) is in substantially the plane of the knife edge. This disposition of the guard plate 49 is obtainable in view of the concave formation of the knife as illustrated in Figure 3. The face 50 of the guard plate thus serves to prevent feeding movement of the material along its seat until the rack has swung to the left and the material is in the plane of the gauge plate. If this guard were not provided, particularly in a construction where the knife is of the concave formation shown, the operator might accidentally feed the material on its seat before the rack has swung to the left and thus the face of the material would be cut or torn as the rack is moved to carry the material away from the disc or knife. The guard 48 may be supported by means of strips 52 extending inwardly from a guard 53 there being an additional strip 54 depending from the frame cross-piece 13.

The guard 53 is extended upwardly and laterally to provide a shield or housing 55 disposed over a shoulder 11' upon the arm 11. Upon the shoulder 11' is positioned a suitable sharpening instrumentality arranged adjacent the knife. The sharpening means in the present instance, comprises a supporting plate 56 having an elongated slot 57 through which passes a securing bolt 58 into the shoulder 11'. The plate 56 has an upright stud 59 upon which is fitted a cap 60 having a depending sleeve portion 61. The cap has a transverse opening to receive a pin 63 upon a block 64 through which extends a shaft 65 carrying at one side of the block a disc 66 of suitable sharpening material, such as emery. The shaft 65 is rotatably mounted in the block 64 and may be retained in position by means of a set screw 66'. The block 64 and its pin 63 are adjustable in the cap 60 and may be held in adjusted position by means of set screw 67; this adjustment permits movement of the sharpening disc 66 relative to its support in order that the proper operative position of the disc against the slicing knife may be obtained. The sharpening disc 66 is urged toward the cutting knife by yielding means such as the spring 70, one end 71 of which is anchored to the cap 60 and the other end 72 of which is anchored to the support. The disc 66 is restrained against movement toward the knife by means of a flexible finger 73 engaging a lug 74 upon the sleeve portion 61 of the cap 60, and when the sharpening element is to be used, the spring finger 73 is flexed out of the path of the lug 74 (Fig. 4) to permit the spring 70 to rotate the cap 60 and move the disc 66 into engagement with the edge of the knife as illustrated in Fig. 4. The mounting of the sharpening element is such that the same has pivotal movement toward and from operative position in engagement with the knife, and additionally has a number of adjustments in order to obtain the proper operative position, namely (1) a bodily adjustment in a direction paralleling the axis of the knife, which is effected by loosening the support securing screw 58 and bodily moving the support and (2) an adjustment toward and from the axis of its own pivotal movement upon the supporting stud 59 which is obtained by moving the pin 63 through the cap 60. The support permitting these various adjustments enables the sharpening device to be provided as a part of the machine and at the same time to obtain the various angular positions which are obtainable when utilizing an independent and unattached sharpening device.

Obviously, the invention is not limited to the precise details of the machine illustrated and described and various modifications will suggest themselves to one skilled in the art, all of which are within the inventive idea.

I claim:

1. In a slicing machine and in combination, a frame, a circular knife rotatively mounted on said frame, means for rotating said knife, a gauge plate positioned adjacent the edge of the knife and movable toward and from the plane of the edge thereof, and means for moving said gauge plate comprising a threaded stud slidably mounted in said frame and affixed to said plate, pin and slot means on said frame and stud for preventing rotation of said stud but permitting axial movement of the latter, and an adjustable nut mounted on said stud and adapted upon rotation to move the same longitudinally in said frame.

2. In a slicing machine and in combination, a frame, a circular knife rotatively mounted on said frame, means for rotating said knife, a gauge plate positioned adjacent the edge of the knife and movable toward and from the plane of the edge thereof, and means for moving said gauge plate comprising a threaded stud slidably mounted in said frame and affixed to said plate, pins on said stud, said frame having slots receiving said pins for preventing rotation of said stud but permitting axial movement of the latter, and an adjustable nut mounted on said stud and adapted upon rotation to adjust the same longitudinally in said frame, said nut having associated therewith a gauge dial.

3. In a slicing machine and in combination, a frame, a vertically disposed circular knife rotatively mounted on a horizontal axis, means for rotating said knife, and a pendent rack manually oscillatable on an axis parallel to the axis of said knife at one side of said knife, said rack having a substantially V-shaped seat for material to be sliced, said seat being open at its end adjacent the knife and adapted to support the material exposed for engagement by the hand of an operator, the supporting faces of said seat extending at substantially a right angle toward the vertical plane of said knife, whereby material on said seat may be fed toward the knife entirely by the pressure of the operator, and independently of the action of gravity, with the inclined faces of the seat serving to guide the material.

In testimony whereof I have hereunto set my hand.

EWALD BREDOW.